US007938479B2

(12) United States Patent
Tuhy

(10) Patent No.: US 7,938,479 B2
(45) Date of Patent: May 10, 2011

(54) RELEASABLE DOOR HINGE

(75) Inventor: Lance Tuhy, Lisbon, ND (US)

(73) Assignee: Clark Equipment Company, West Fargo, ND (US)

( * ) Notice: Subject to any disclaimer, the term of this patent is extended or adjusted under 35 U.S.C. 154(b) by 7 days.

(21) Appl. No.: 12/425,970

(22) Filed: Apr. 17, 2009

(65) Prior Publication Data

US 2010/0264696 A1 Oct. 21, 2010

(51) Int. Cl.
*B62D 33/06* (2006.01)
*B60J 5/02* (2006.01)

(52) U.S. Cl. ................ 296/190.11; 296/146.11; 16/233; 16/270; 16/382

(58) Field of Classification Search ............... 296/190.1, 296/190.11, 146.11; 16/231–233, 382, 254, 16/258, 270
See application file for complete search history.

(56) References Cited

U.S. PATENT DOCUMENTS

| | | | | |
|---|---|---|---|---|
| 1,634,052 | A | 6/1926 | Ryan et al. | |
| 1,896,203 | A | 12/1930 | Rosatelli | |
| 2,185,888 | A * | 1/1940 | Donahoe | 49/185 |
| 2,778,053 | A | 1/1957 | Hess et al. | |
| 3,410,599 | A | 11/1968 | Kettler | |
| 3,734,076 | A | 5/1973 | Kiziol | |
| 3,747,273 | A | 7/1973 | Johnson | |
| 3,851,845 | A | 12/1974 | Edwards | |
| 3,869,753 | A * | 3/1975 | Boback | 16/382 |
| 3,934,925 | A | 1/1976 | Fetsch | |
| 3,944,097 | A | 3/1976 | Savage | |
| 4,102,011 | A | 7/1978 | Clack, Jr. | |
| 4,131,970 | A | 1/1979 | Le Van | |
| RE30,717 | E | 8/1981 | Dargene | |
| 4,443,035 | A | 4/1984 | Saemann | |
| 4,652,043 | A | 3/1987 | Hurlburt | |
| 4,667,367 | A | 5/1987 | White et al. | |
| 4,880,269 | A | 11/1989 | Jensen et al. | |

(Continued)

FOREIGN PATENT DOCUMENTS

| | | | |
|---|---|---|---|
| DE | 102 47 453 | A1 | 4/2004 |

(Continued)

OTHER PUBLICATIONS

PCT/US2010/030687 PCT Search Report and Written Opinion mailed Jan. 6, 2010.

*Primary Examiner* — Dennis H Pedder
(74) *Attorney, Agent, or Firm* — John D. Veldhuis-Kroeze; Westman, Champlin & Kelly, P.A.

(57) ABSTRACT

A power machine having a frame, an engine, a cab defining an operator compartment having an access opening, and a door capable of being attached to the cab adjacent the opening is discussed. A hinge includes first and second hinge components attached to the cab and the door, respectively. A hinge securing mechanism for securing the second hinge component to the door is attached to the door. The mechanism includes a shaft with a handle moveable between first and second positions coupled to its first end and a protrusion extending radially proximal to its second end. The shaft extends through a bore in the door so that the handle is proximal to an interior surface and the protrusion is proximal to an exterior surface of the door. The shaft extends through an aperture in the second hinge component when the second hinge component is mounted to the door.

15 Claims, 14 Drawing Sheets

U.S. PATENT DOCUMENTS

| | | | | |
|---|---|---|---|---|
| 4,986,593 | A | | 1/1991 | Lohmann |
| 5,011,215 | A | | 4/1991 | Kalina |
| 5,067,200 | A | | 11/1991 | Stowell et al. |
| 5,076,637 | A | | 12/1991 | Larkin et al. |
| 5,095,582 | A | | 3/1992 | Ohlsson |
| 5,421,633 | A | * | 6/1995 | Moore et al. .................. 296/165 |
| 5,504,974 | A | | 4/1996 | Graber |
| 5,615,918 | A | | 4/1997 | Ferrell |
| 5,642,915 | A | | 7/1997 | Ackermann et al. |
| 5,655,798 | A | | 8/1997 | Kaveney et al. |
| 5,873,612 | A | | 2/1999 | Connor |
| 6,247,746 | B1 | | 6/2001 | Brush |
| 6,427,383 | B1 | | 8/2002 | Brooks et al. |
| 6,561,572 | B1 | | 5/2003 | Martin, Jr. |
| 6,691,953 | B2 | | 2/2004 | Leclerc |
| 6,811,209 | B2 | | 11/2004 | Woollett et al. |
| 6,860,542 | B1 | | 3/2005 | Zabtcioglu |
| 7,614,117 | B2 | * | 11/2009 | Selvaraj .......................... 16/258 |
| 2003/0067188 | A1 | | 4/2003 | Go |
| 2007/0245522 | A1 | | 10/2007 | Selvaraj |
| 2008/0191514 | A1 | | 8/2008 | Lieble et al. |

FOREIGN PATENT DOCUMENTS

| | | | |
|---|---|---|---|
| JP | 58 093157 | U | 6/1983 |
| JP | 07 102590 | A | 4/1995 |
| WO | 0032427 | A1 | 6/2000 |

* cited by examiner

RELEASABLE DOOR HINGE

FIELD OF THE DISCLOSURE

The present discussion is related to self-propelled power machines. More particularly, the present discussion is related to operator compartments for power machines.

BACKGROUND

Self-propelled power machines such as loaders are capable of performing a variety of tasks, including digging, carrying material, leveling, pushing snow and the like. In addition, there are a number of different attachments such as graders, planers, powered brooms, augers, to name only a few, that can be coupled to power machines to increase the functionality and versatility of a loader. As a result, power machines are increasingly used in a variety of applications and environments. Such machines typically have an operator compartment in which an operator can sit and operate the power machine.

Due to the large number of different applications and environments in which such machines are employed, some of which can be harsh, it can advantageous to have an enclosed operator compartment. It is common for such machines to have heaters and/or air conditioning units. Operator compartments typically have an ingress/egress passage through which an operator can enter or exit the machine. Enclosed operator compartments include a door, which encloses the passage as required, as well as being openable to allow an operator to move freely in and out of the machine. In some circumstances, it may be necessary to exit a machine while there is an obstruction that does not make opening the door using normal procedures feasible.

SUMMARY

In one illustrative embodiment, a power machine having a frame, an engine, and a cab that defines an operator compartment having an opening for allowing access thereto is disclosed. The power machine also includes a door having an interior surface and an exterior surface that is capable of being attached to the cab. The power machine includes a hinge for attaching the door to the cab. The hinge has a first hinge component attached to the cab and a second hinge component having a face with aperture formed through it that is configured to be attached to the door at a hinge mounting location. A hinge securing mechanism is rotatably attached to the door for securing the second hinge component to the door. The hinge securing mechanism includes a shaft with a handle coupled to a first end of the shaft and a protrusion extending radially from the shaft proximal to a second end of the shaft. The door has a bore formed through it at the hinge mounting location. The shaft extends through the bore so that the handle is positioned proximal to the interior surface and the protrusion proximal to the exterior surface. The handle is moveable between a first position and a second position. The second hinge component is positioned so that the shaft extends through the aperture formed in the second hinge component when the second hinge component is mounted to the door.

DETAILED DESCRIPTION

Figure 1:
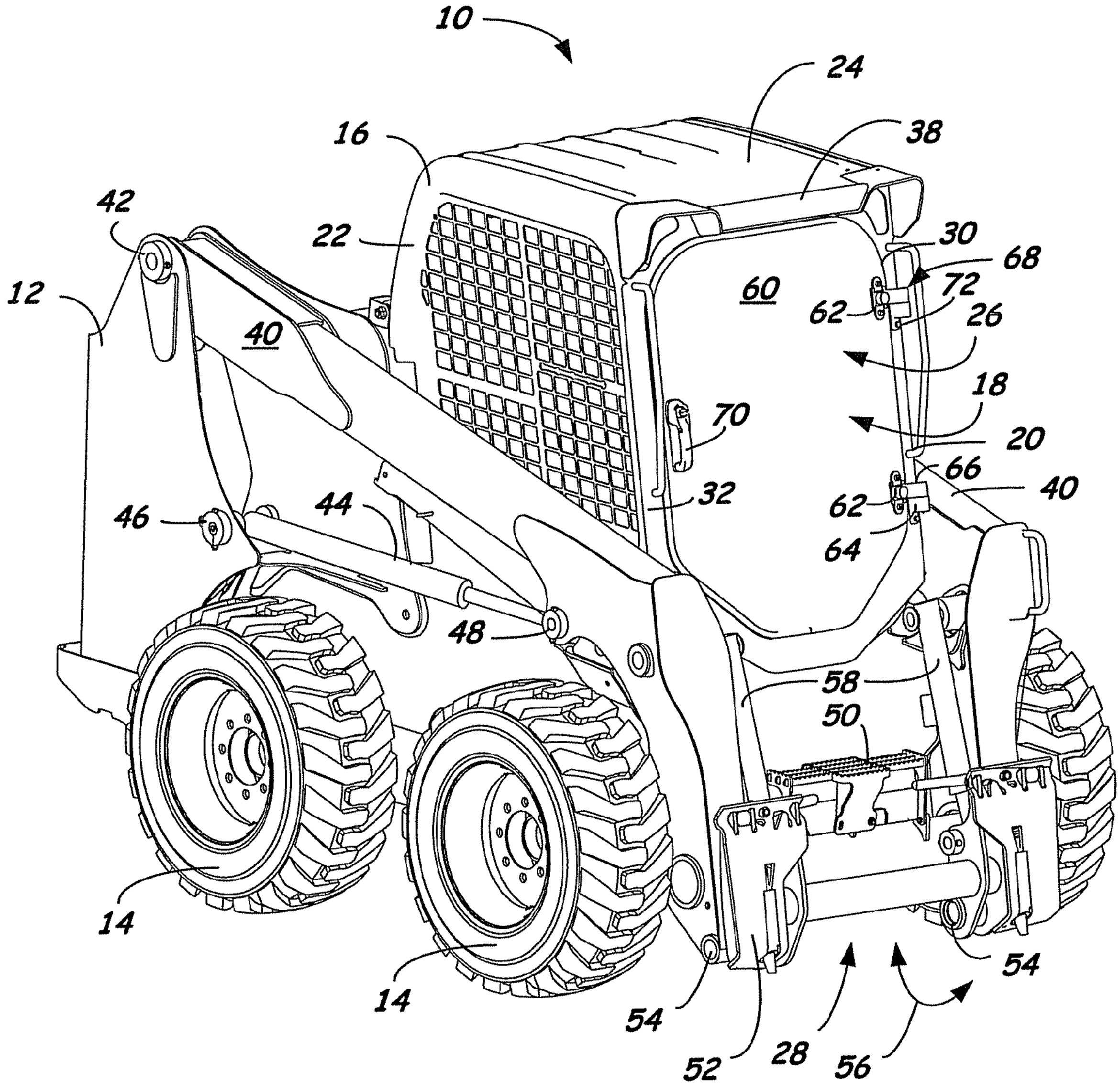
FIG. 1 is a perspective view illustrating a power machine of the type that is useful to employ the embodiments of the present discussion.

FIG. 1 illustrates a power machine 10 of the type that is useful for employing the embodiments discussed in the current disclosure. The power machine 10 shown in FIG. 1 is a skid steer loader. However, it should be appreciated that the attachments discussed below are capable of interfacing with a number of different types of power machines. For example, the power machine 10 can be a mini excavator, wheeled or tracked loader, utility vehicle, all-wheel steer loader, or a walk behind loader, to name a few. While the embodiments discussed below are related to a skid steer loader, it should be noted that that is for illustrative purposes only and is not intended to be a limitation. Power machine 10 includes a frame 12 that is supported by wheels 14. Power machine 10 has an engine (not shown), which supplies power to the wheels 14 causing the power machine 10 to move under the control of an operator. Frame 12 supports a cab 16, which defines an operator compartment 18. The cab 16 illustratively includes first and second sides 20 and 22, which support a top 24. The cab 16 includes an aperture 26 positioned toward a proximal end 28 of the power machine 10 through which an operator can enter and exit the operator compartment. The aperture 26 is defined by proximal edges 30 and 32 of along first and second sides 20 and 22, respectively, of the cab 16 and a cross member 38, which extends between the proximal edges 30 and 32. The proximal edges 30 and 32, along with the cross member 38 define a frame for the aperture 26. An operator can sit in the operator compartment 18 and control the power machine 10 by manipulating a plurality of controls (not shown) with his or her hands and/or feet.

Power machine 10 further includes a pair of lift arms 40, each of which is coupled to the frame 12 at a pivot point 42 (only one of the pivot points is shown) on either side of the power machine 10. The power machine 10 also includes a pair of actuators 44 (only one is shown), each of which is coupled to the frame 12 at first pivot point 46 and one of the lift arms 40 at second pivot point 48. In one illustrative embodiment, the actuators 44 are hydraulic cylinders. The actuator 44 is shown in a retracted position. When the actuators 44 are extended, the lift arms 40 pivot about the pivot point 42 and raise above the position shown in FIG. 1. For example, the lift arms can be raised so that a crossmember 50, which extends between lift arms 40 is positioned directly in front of the aperture 26. It should be appreciated that while the power machine 10 shown has lift arms 40 that travel in a generally arcuate path about pivot point 42, other power machines can have different geometric arrangements for their lift arms that cause their lift arms to travel in other paths. For example, some power machines have a lift arm arrangement that causes the lift arms to be raised in a generally vertical path.

Power machine 10 further includes an attachment interface 52, which is rotatably coupled to the lift arms 40 about attachment points 54. A pair of tilt actuators 58 are coupled to the attachment interface 52 to cause the attachment interface to rotate about attachment points 54 in a direction shown by arrow 56. In some embodiments, a single tilt actuator, or more than two tilt actuators, may be attached to the attachment interface 52. The power machine 10 is shown for illustrative purposes only and other configurations, for example, incorporating only one lift actuator, instead of the two illustrated in FIG. 1 or alternative lift arm arrangements can be incorporated without departing from the scope of this discussion.

The power machine 10 illustrated in FIG. 1 also includes a door 60, which is attached to the frame of the cab 16 and positioned over the aperture 26 in the cab 16. The door 60 is shown in a closed position. When the door 60 is in the closed position, it generally closes off the operator compartment 18. The door 60 is illustratively coupled to the cab 16 via a pair of hinges 62, each of which include first and second hinge components or wings 64 and 66, respectively, that are attached to each other at a pivot 68. In one illustrative embodiment, the second hinge wing 66 has a pin (not shown in FIG. 1) that engages a socket (not shown) in the first hinge wing 64 to attach the hinge wings or components together. It should be appreciated that other arrangements for attaching the hinge wings or components together may be employed within the scope of this discussion.

The first hinge wing 64 of each hinge 62 is coupled to the cab 16 with a pair of fasteners 72 (one of which is illustrated as being attached to each of the first wings 64 of the hinges 62 in FIG. 1). The second hinge wing 66 is coupled to the door 60. The coupling of the second hinge wing 66 to the door 60 will be discussed in more detail below. When the door 60 is in the closed position, a latch mechanism attached to the door 60, (not shown in FIG. 1), is positioned so that it can engage a catch (not shown) that is mounted to the cab 16 on or near the edge 30 of the first side 34. The latch mechanism is configured so that it can be manipulated by a handle 70 to cause the latch to become disengaged from the catch. When the latch is not engaged with the catch, the door 60 is free to pivot about the hinges 62 to an open position, provided no other obstruction impedes the rotating path of the door 60. One situation, discussed briefly above, where such an obstruction may be positioned so as to impede the rotating path of the door 60 is when the lift arms 40 are partially raised so that the cross member 50 is positioned directly in front of a portion of the door 60.

Figure 2:
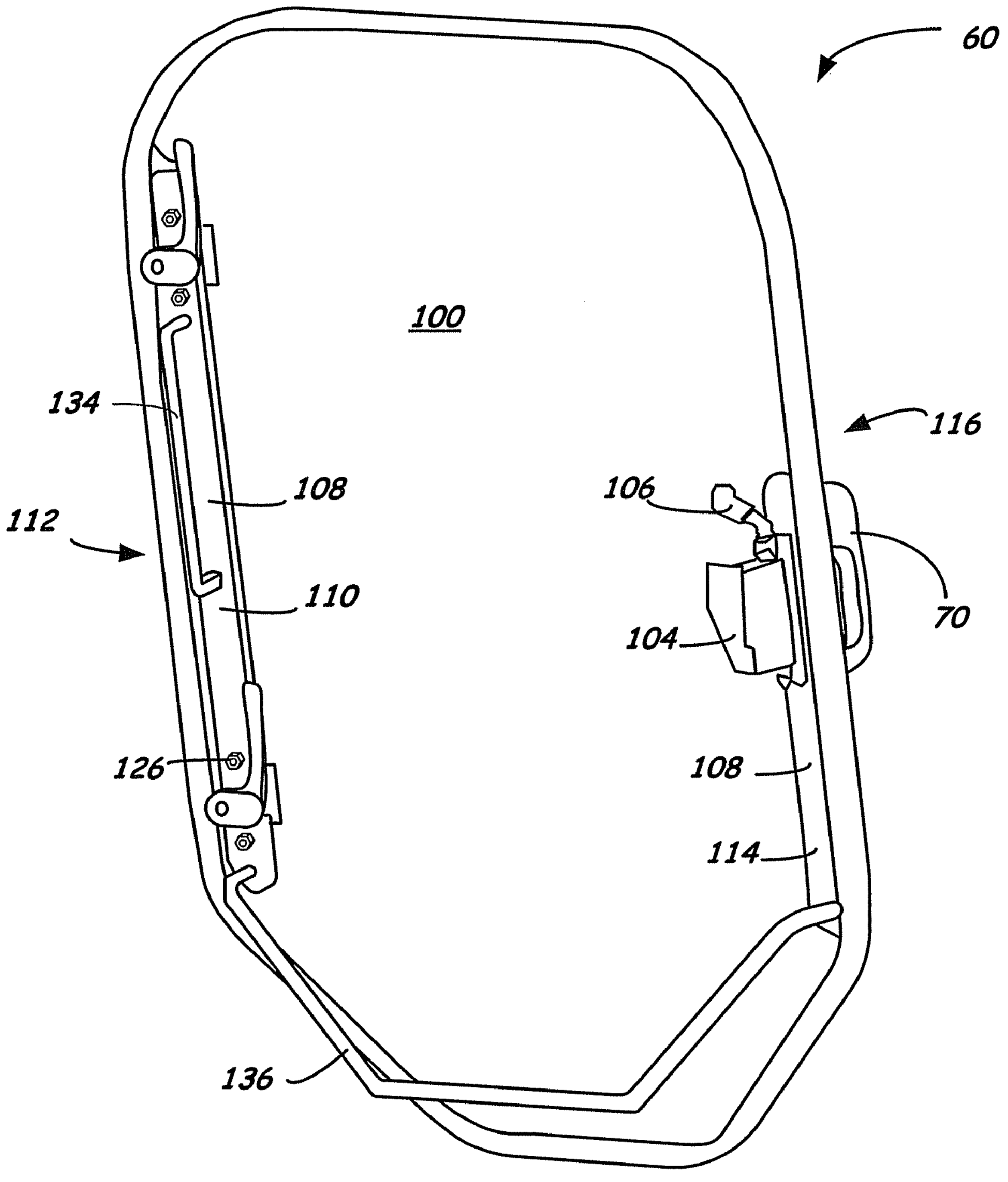
FIG. 2 is a perspective view of an interior surface of a door configured to be attached to the power machine of FIG. 1.
Figure 3:
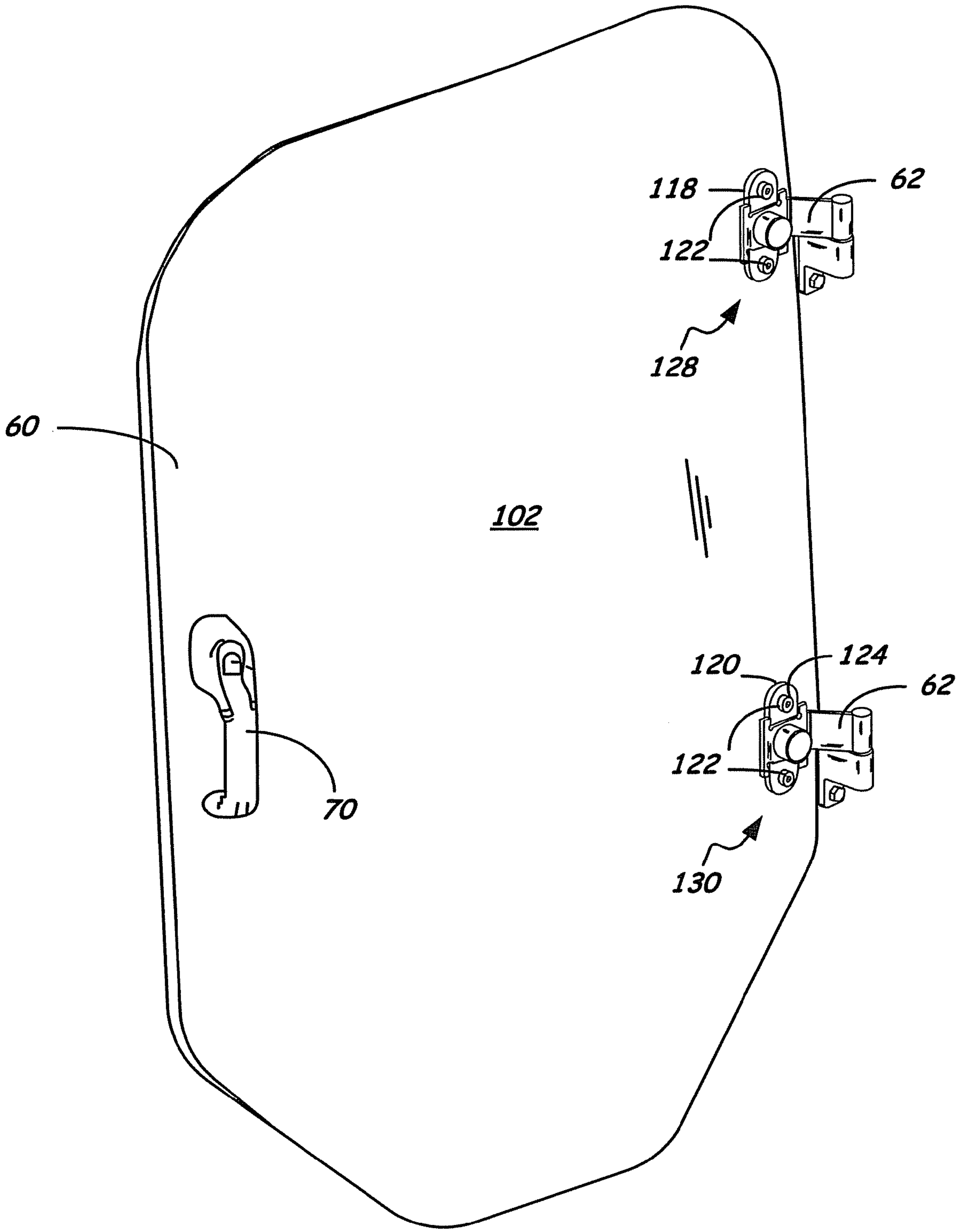
FIG. 3 is a perspective view of an exterior surface of the door of FIG. 2.

FIGS. 2 and 3 provide perspective views of the door 60 illustrated in FIG. 1 according to one illustrative embodiment. Door 60, in one illustrative embodiment, is generally transparent and has an interior surface 100 and an opposing exterior surface 102. The door 60 is made of any suitable material, including, for example, tempered glass or Plexiglas. FIG. 2 illustrates a latch mechanism 104 that is operatively coupled to handle 70. When the door 60 is in the closed position, as shown in FIG. 1 relative to the power machine 10, the interior surface 100 of the door is positioned so that it is facing the operator compartment 18. In addition, lever 106 is also capable of manipulating the latch mechanism 104 to cause the latch mechanism to be freed from a catch.

A support structure 108 is fixedly attached to the door 60 along the interior surface 100. The support structure 108 illustratively includes a first portion 110 that is attached to and extends along a first side 112 of the door 60 and a second portion 114 that is attached to and extends along a second side 116 of the door 60. A third portion 118 and a fourth portion 120 of the support structure 108 are each positioned along the exterior surface 102 on the first side 112 of the door 60. Each of the third portion 118 and the fourth portion 120 of the support structure are attached to the first portion 110 with a plurality of fasteners 122. In the embodiment shown in FIGS. 2 and 3, the fasteners 122 each include a bolt 124 that extends through a mounting aperture (not shown in the FIGs.) in the door 60 that mates with a nut 126 to secure the first portion 110 to each of the third portions 118 and the fourth portion 120 as well as securing the third and fourth portions 118 and 120 to the door 60. Other acceptable fastening arrangements to secure the third and fourth portions 118 and 120 may be used without departing from the scope of the discussion. The third and fourth portions 118 and 120 are configured to engage a portion of the hinges 62 as shown in FIG. 3 and is discussed in more detail below.

The arrangement of the first portion 110, the third portion 118 and the door 60 form a first hinge mounting location 128. Likewise, the arrangement of the first portion 110, the fourth portion 120 and the door 60 form a second hinge mounting location 130. The door 60 has a pair of apertures 132 (shown in FIG. 8) extending through it at each of the first hinge mounting location 128 and the second hinge mounting location 130. Likewise portions of the support structure 108 located at each of the first and second hinge mounting locations 128 and 130 are configured so that the apertures formed in the components of the support structure 108 are aligned with aperture 132.

The support structure 110 illustratively provides support for various articles that may be advantageously positioned in close proximity to the door 60. For example, a grab handle 134 is attached to the first portion 110 of the support structure 108. The grab handle 134 is advantageously provided to allow an operator to grab and pull from inside the operator compartment to move the door 60 from an open to a closed position. Also illustrated in FIG. 2 is a wiper mount 136, which is attached to each of the first portion 110 and the second portion 114 of the support structure 108. The wiper mount 136 provides support for a wiper motor (not shown), which is attached to the wiper mechanism such as a wiper blade (also not shown) to control movement of the wiper mechanism in relation to the door 60. Other structures and devices can be attached to the support structure 108 as desired.

Figure 4:
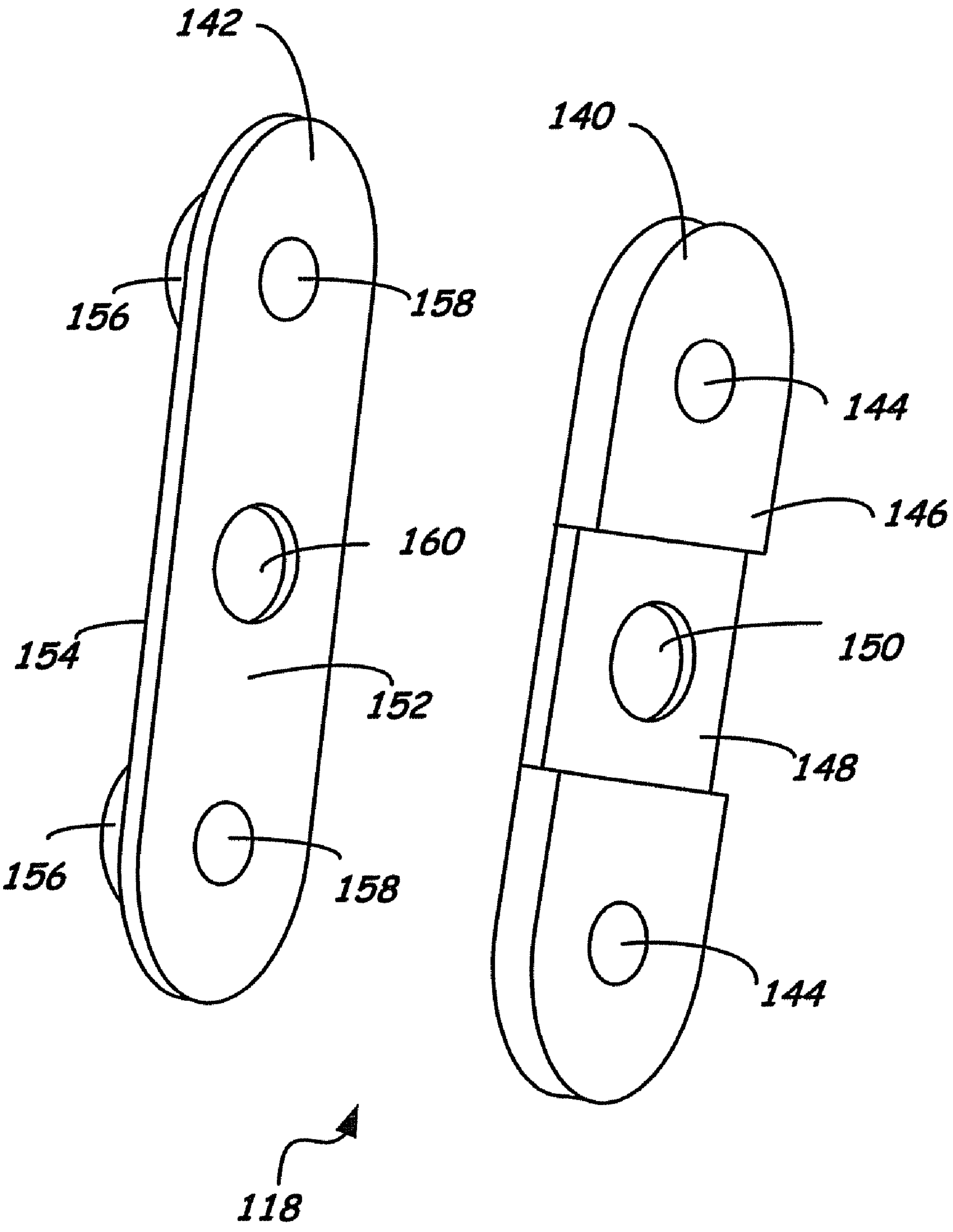
FIG. 4 illustrates a portion of a support structure for the door of FIG. 3 configured to be attached to the exterior surface of the door.

FIG. 4 illustrates a third portion 118 of the support structure 108 according to one illustrative embodiment. It should be appreciate that the fourth portion 120 of the support structure 108 is substantially similar to the third portion 118 in some embodiments, including the one illustrated in FIGS. 1 and 2. Therefore, the description of the third portion discussed immediately below and illustrated in FIG. 4 can also be applied to the fourth portion 120. The third portion 118 is shown as including two members, a first member 140 and a second member 142. The first member 140 is a generally rigid member that is capable of engaging the second hinge wing 66 and having the second hinge wing 66 attached to it. In one embodiment, the first member 140 is formed from a hard material such as steel, although other suitable materials may be used. The first member 140 includes a pair of apertures 144 that are positioned to be aligned with mounting apertures that extend through the door 60 when the first member 140 is in a proper mounting position with respect to the door 60.

The first member 140 has a face 146 with a notch 148 formed into it. The notch 148 has a reduced thickness than other portions of the first member and is capable of engaging the second hinge wing 66 when it is positioned adjacent the first member 140 to prevent the second hinge wing 66 from rotating with respect to the first member 140. The engagement relationship between the first member 140 and the second hinge wing 66 will be discussed in more detail below. An aperture 150 extends through the notch 148 in the first member 140. When the first member 140 is attached to the door 60, aperture 150 is aligned with an aperture in the door.

The second member 142 is illustratively positioned between the first member 140 and the door 60. The second member 142 is, in one embodiment, a rubber or other similar compressible material. The second member 142 has a first major surface 152 and an opposing second major surface 154. The first major surface 152 of the second member 142 is configured to be positioned adjacent the first member 140. A pair of shoulders 156 extend from the second major surface. An aperture 158 extends from the first major surface 152 through each of the shoulders 156. The shoulders 156 are positioned to fit into mounting apertures in the door 60 and the apertures 158 are aligned with the apertures 144 in the first member 140 as well when the third portion 118 is attached to the door 60. The second member 142 also includes a center aperture 160 that is aligned with the aperture 150 when the second member 142 is attached to the door 60.

Figure 5:
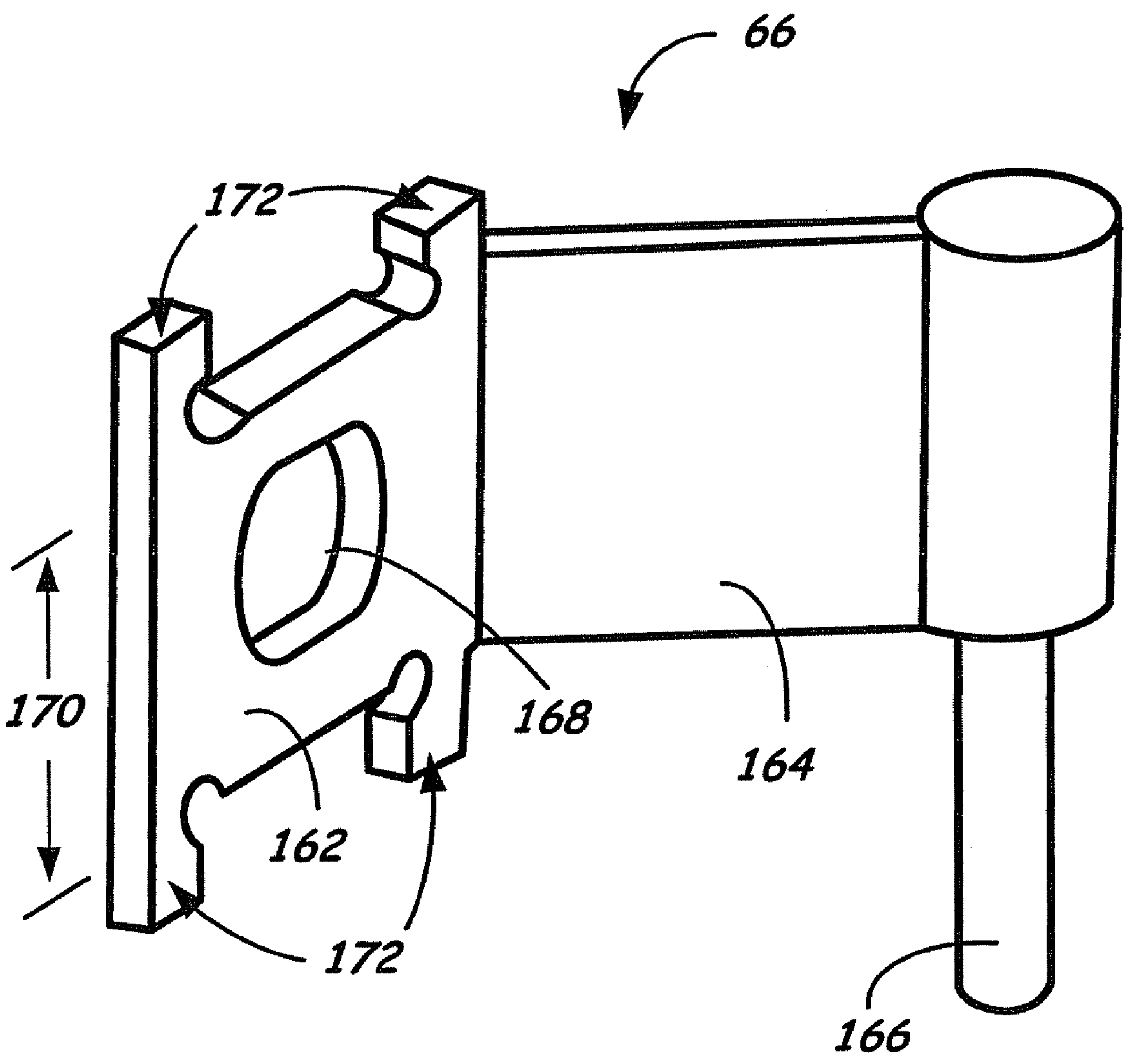
FIG. 5 illustrates a portion of a hinge for attaching the door of FIG. 2 to the power machine according to one illustrative embodiment.

FIG. 5 illustrates the second hinge wing 66 in more detail according to one illustrative embodiment. The second hinge wing 66 has a generally flat face 162 and an angled portion 164 that extends from the face 162 to a pin 166, which is configured to engage with a socket in the first hinge wing 64. A generally oblong shaped aperture 168 that extends through the face 162. A portion of the face 162 has a height 170, which allows the face 162 to be seated within and engage the notch 148 when the second hinge wing 66 is positioned adjacent one of the first members 140. In addition, the face 162 has tabs 172 that are configured to engage the first member 140 as well. Engagement between the first member 140 and the second hinge wing 66 prevents rotation of the second hinge wing 66 when it is attached to the door.

Figure 6:
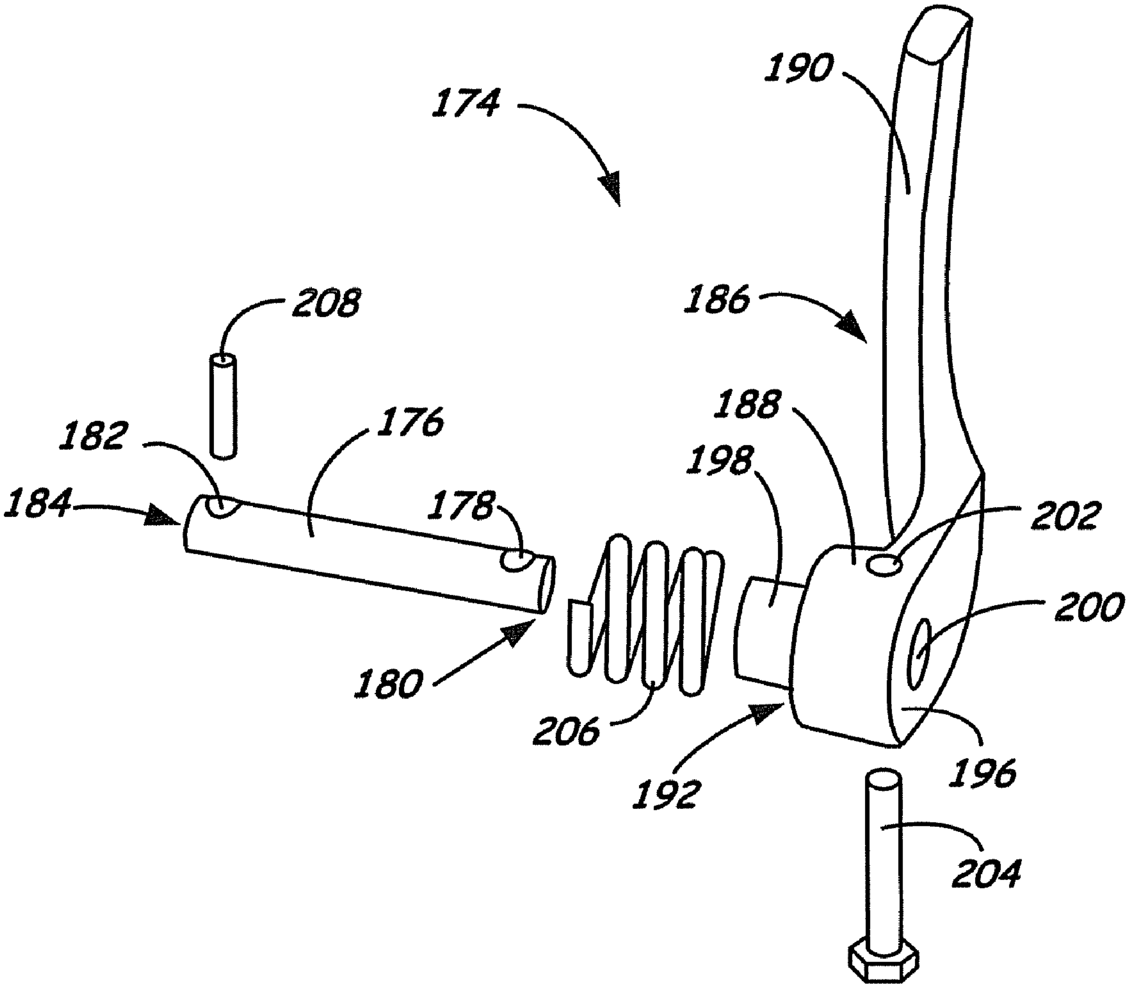
FIG. 6 illustrates an exploded view of a hinge securing mechanism for attaching the hinge portion of FIG. 5 to a door according to one illustrative embodiment.

As discussed above, a pair of second hinge wings 66 are positioned adjacent support structure 108, more particularly adjacent each of the third portion 118 and the fourth portion 120. In one illustrative embodiment, the second hinge wings 66 are attached to the door 60 to rotatably secure the door 60 to the cab 16. FIG. 6 illustrates an exploded view of a hinge securing mechanism 174 that is configured to be attached to the door 60 at each of the first hinge mounting location 128 and the second hinge mounting location 130. The hinge securing mechanism 174 includes a shaft 176 with a first cross bore 178 formed into the shaft 176 near a first end 180 and a second cross bore 182 formed into the shaft 176 near a second end 184.

The hinge securing mechanism 174 also includes a handle 186. The handle 186 includes a base portion 188 that is configured to be attached to the shaft 176 and a lever 190 that extends from the base portion 188. The base portion 188 has a first surface 192 and an opposing second surface 196. A collar 198 extends from the first surface 192 and a bore 200 extends through the collar 198 to the second surface 196. A third cross bore 202 extends through the base portion 188 so that the third cross bore 202 also extends through the bore 200. The bore 200 is sized so that the first end 180 of shaft 176 can be received into it. When the first end 180 of the shaft 176 is inserted into the bore 200 and the shaft 176 is positioned so that the first cross bore 178 is aligned with the third cross bore 202, a pin 204 is inserted through the first cross bore 178 and the third cross bore 202 to secure the handle 186 to the shaft 176. In one embodiment the pin 204 is threaded and the third cross bore 202 is likewise threaded so that pin 204 can be securely fastened to the base portion 188 of the handle 186. Other fastening arrangements can be made to secure pin 204 without departing from the scope of the discussion. It should also be appreciated that although the shaft 176 and the handle 186 are illustrated as being two separate components that are attached to each other, in some embodiments they can be a single, integrated component.

FIG. 6 also illustrates a spring 206 and a pin 208. Spring 206 is fitted over the shaft 176 and the collar 198 when the hinge securing mechanism 174 is attached to the door 60. The spring 206 provides a force to hold the second hinge wing 66 to the door as will be discussed in more detail below. Pin 208 is configured to fit into second cross bore 182 to help secure the hinge securing mechanism 174 to the door 60.

Figure 7:
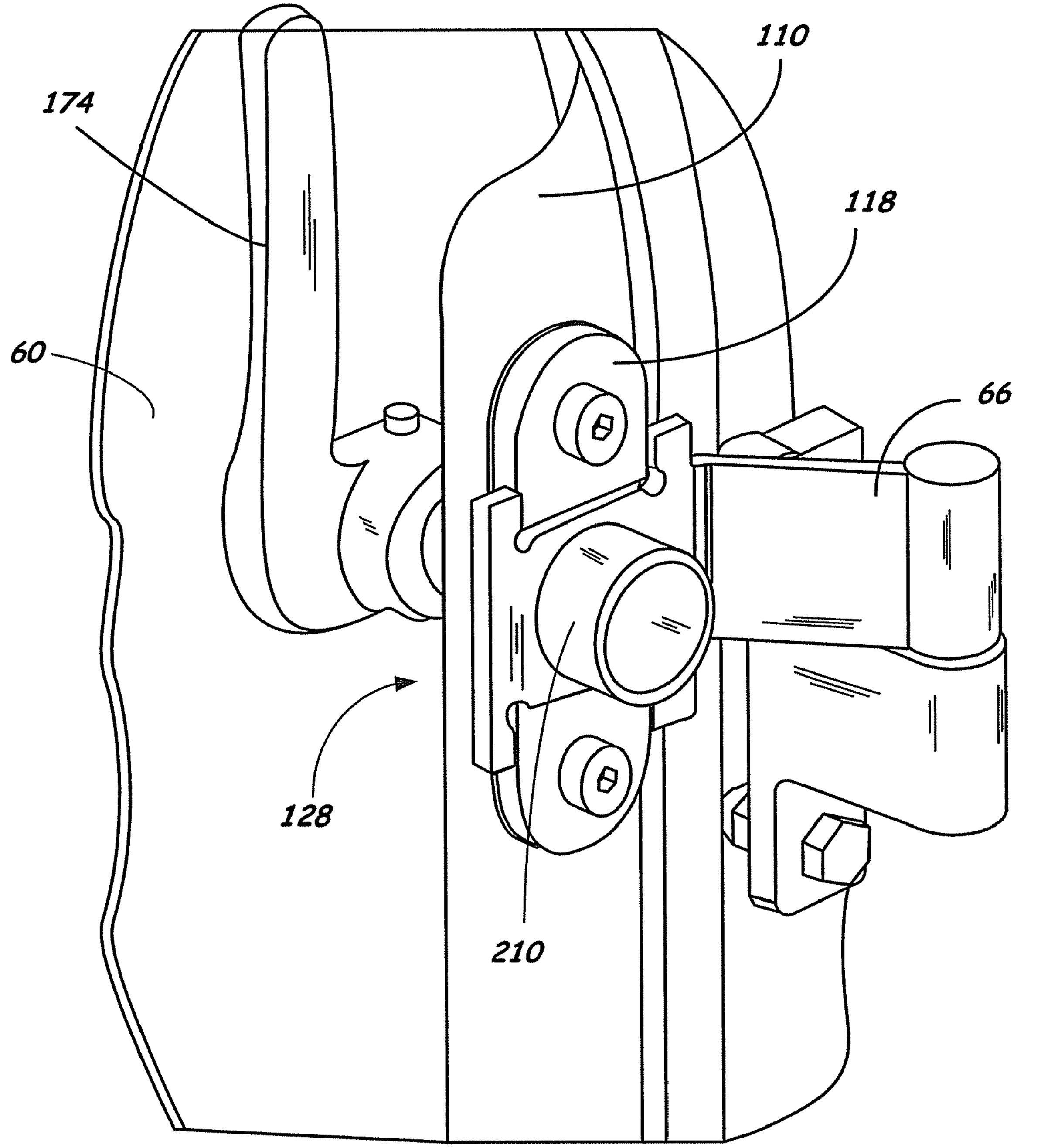
FIG. 7 is a perspective view of a portion of the door of FIG. 2 with the hinge securing mechanism attached to the door according to one illustrative embodiment.
Figure 8:
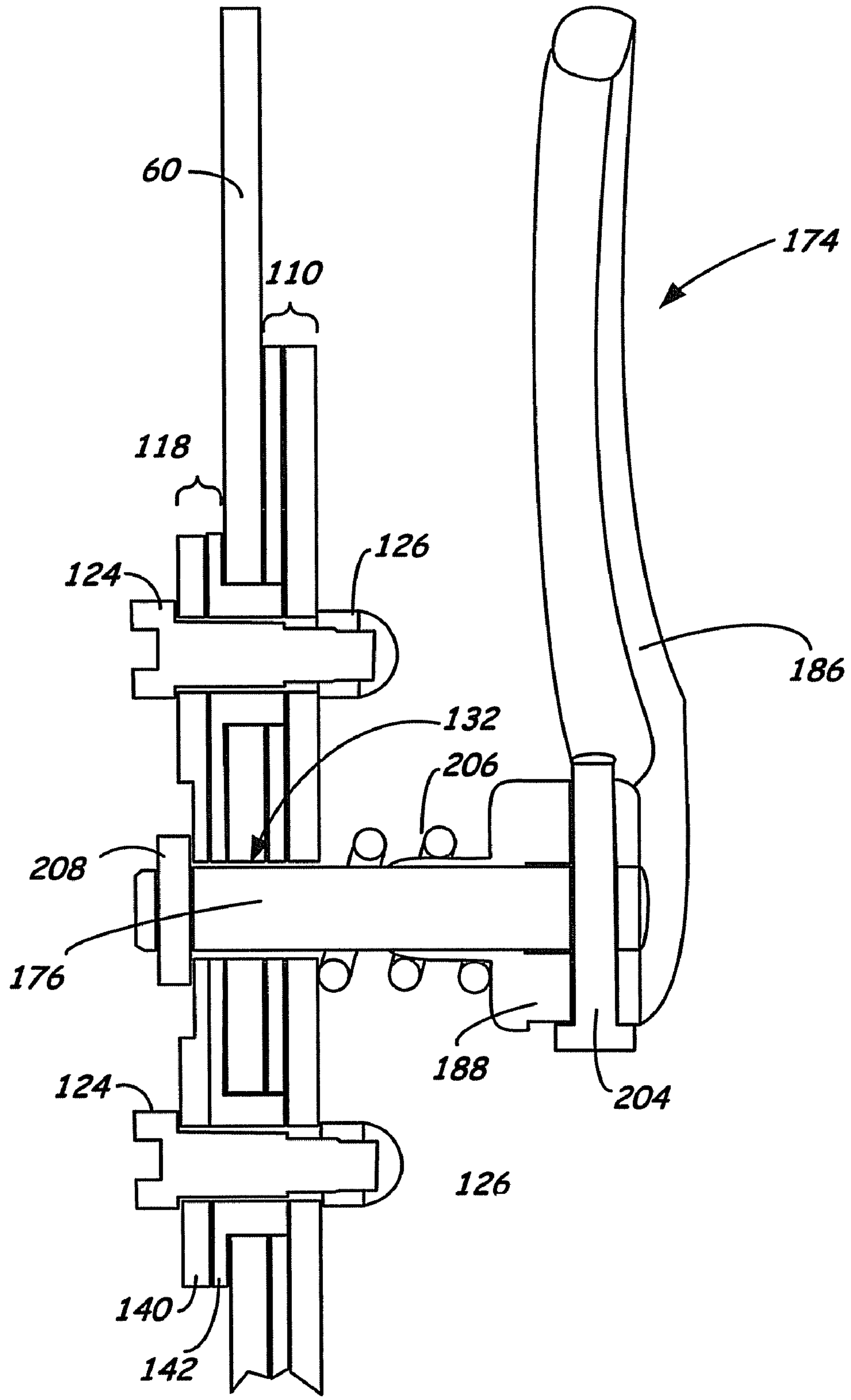
FIG. 8 is a cross-sectional view of the hinge securing mechanism attached to the door taken at a hinge mounting location.

FIGS. 7 and 8 illustrate the hinge securing mechanism 174 attached to the door 60 at the first hinge mounting location 128. In FIG. 7, a bushing 210 is coupled to the hinge securing mechanism 174 so that the bushing 210 applies a force against the second hinge wing 66. FIG. 8 is a cross sectional view that shows the hinge securing mechanism 174 attached to the door 60. The aperture 132 at the first hinge mounting location 128 is sized so that the shaft 176 can be fitted through it. However, when the pin 208 is inserted into the second cross bore 182, the hinge securing mechanism 174 is captured to the door 60 so that it can not be removed from the door 60 without being disassembled. Returning briefly to FIG. 5, the generally oblong shaped aperture 168 is shaped to allow the second hinge wing 66 to be fitted over the second end 184 of the shaft 176, including the pin 208 when it is fitted into the second cross bore 182. The spring 206 is shown in FIG. 8 as being captured between the first portion 110 of the support structure 108 and the base portion 188 of the handle 186. The spring 206 acts to generally push the handle 186 away from the door 60, with the hinge securing mechanism 174 remaining secured to the door 60 because of the interference between the pin 208 and the first member 140 of the third portion 118 of the support structure 108.

Figure 9A:
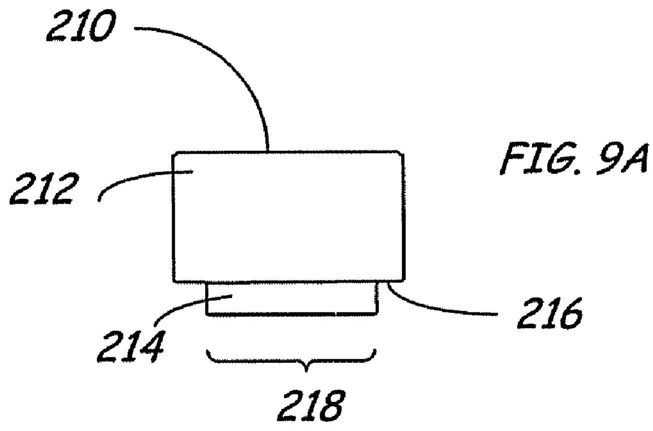
FIGS. 9A-9D illustrate a bushing that is configured to be attached to the hinge securing mechanism according to one illustrative embodiment.
Figure 9B:
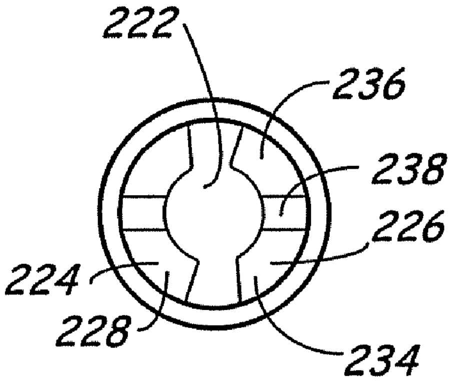
Figure 9C:
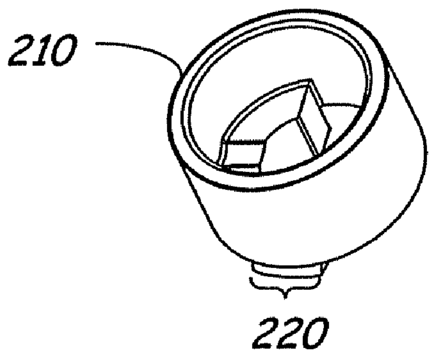
Figure 9D:
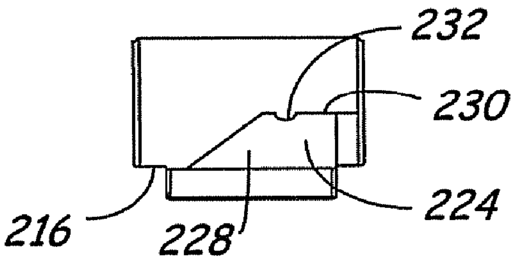

FIGS. 9A-9D illustrate a bushing 210 that is configured to accept the second end 184 of the shaft 176 and be attached to the hinge securing mechanism 174. The bushing 210 has a main portion 212 and a neck 214, which extends from a first end 216 of the main portion 212. The main portion 212 is generally cylindrically shaped, while the neck 214 is illustrated as having a generally rectangular cross section. The neck 214 has a length 218 and a width 220 such that it will fit in the aperture 168 in the second hinge wing 66. The bushing 210 has an irregularly shaped bore 222 that extends through the main portion 212 and the neck 214. The bore 222 is shaped to accept the second end 184, including pin 208 extending from the shaft 176 into the bushing 210. The bore 222 is partially defined by a pair of internal structural features 224 and 226 located within the main portion 212 of the bushing 210, which in one embodiment, are substantially mirror images of each other. FIG. 9D is a cross sectional view of the bushing 210, illustrating feature 224. Feature 224 includes a ramp 228 that extends inside of the main portion 212 from first end 216 of the main portion 212 to a top surface 230 of the feature 224. A channel 232 is formed into the top surface 230. Feature 226 similarly includes a ramp 234, a top surface 236 and a channel 238. Channels 232 and 238 are advantageously sized and in alignment with each other so that pin 208 can be seated in both of them simultaneously.

Figure 10:
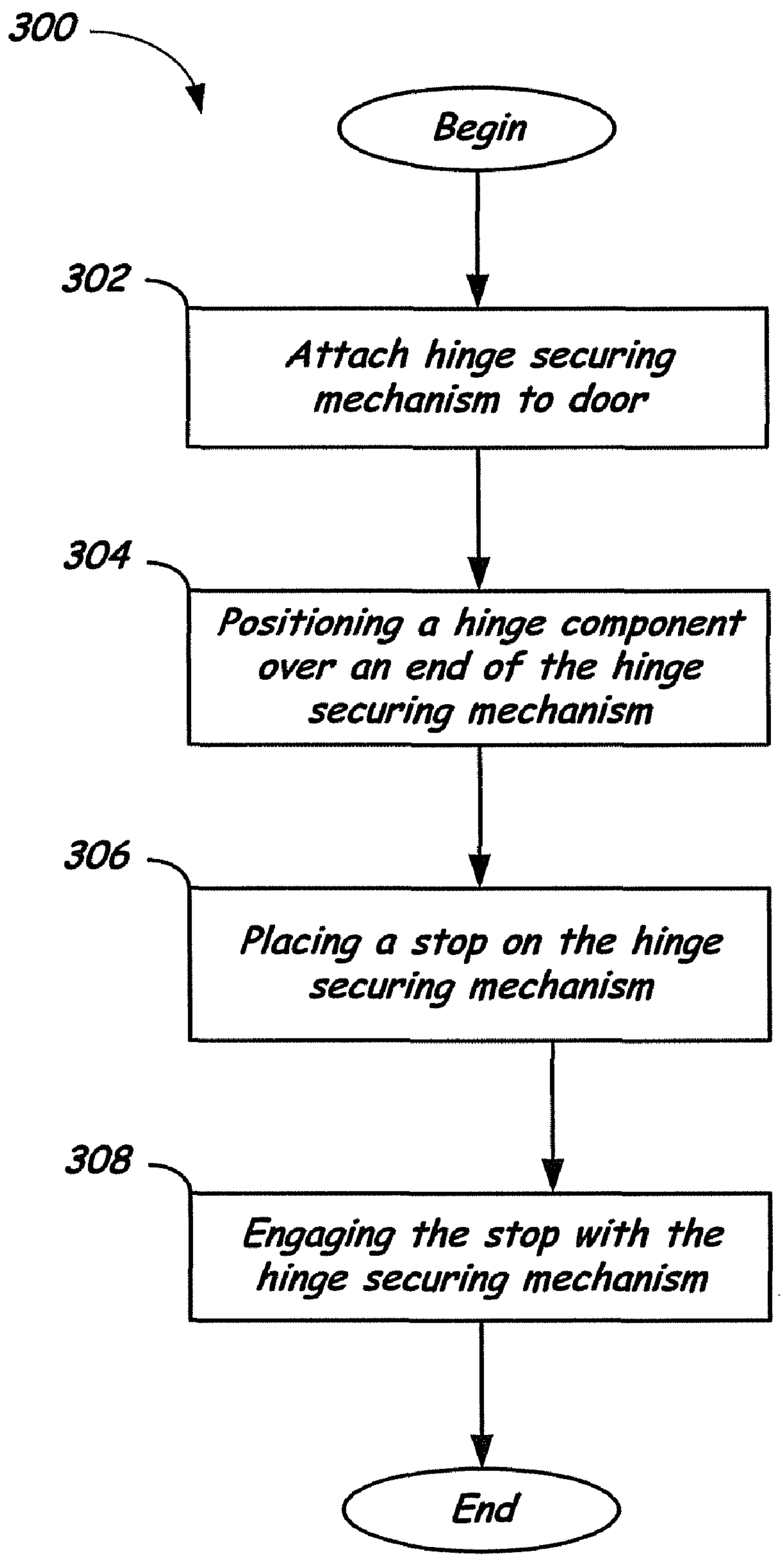
FIG. 10 is a flowchart illustrating a method of securing a door to a cab according to one illustrative embodiment.

FIG. 10 illustrates a method 300 for releaseably securing a door to the cab of a power machine according to one illustrative embodiment. Method 300 includes attaching a hinge securing mechanism to a door. This is illustrated in block 302. One embodiment of a hinge securing mechanism of the type that can be employed to accomplish method 300 is hinge securing mechanism 174, as discussed above. In one embodiment, a pair of hinge securing mechanisms 174 are illustratively attached to the door 60 at first and second hinge mounting locations 128 and 130, although in other embodiments a different number of hinges may be employed to secure a door to the cab of a power machine and correspondingly a matching number of hinge securing mechanisms are advantageously secured to the door in method 300.

Attaching hinge securing mechanism 174 to door 60 illustratively includes attaching the shaft 176 to the handle 186 and placing the spring 204 onto the shaft 176. Then the shaft 176 is inserted into the aperture 132 so that the second end 184 of the shaft 176 protrudes from the exterior surface 102 of the door 60. Pin 208 is then inserted into second cross bore 182 to secure the shaft 176 within the aperture 132.

Once the hinge securing mechanism is attached to the door, method 300 includes positioning a hinge component over an end of the hinge securing mechanism. This is illustrated in block 304. In the embodiments discussed above, the aperture 168 of the illustrative second hinge wing 66 is fitted over the shaft 174 so that the pin 208 has passed through the aperture 168. As discussed above, the aperture 168 is generally oblong in shape, that is, it is generally longer than it is high. The pin 208 is capable of being inserted through the aperture 168 when the pin is oriented in alignment with the length of the aperture 168. This can be achieved by positioning the second hinge wing 66 relative to the pin 208. While this may be relatively easy to do if the second hinge wing 66 attached to the first hinge wing 64, it may not be particularly easy to accomplish if the second hinge wing 66 is attached to the first hinge wing 64. Alternatively, the pin 208 can be oriented with respect to the aperture 168 by rotating the lever 190, which will cause the shaft 176 and, by extension, pin 208 to rotate with respect to the aperture 168 so that pin 208 can fit through the aperture 168.

Figure 11:
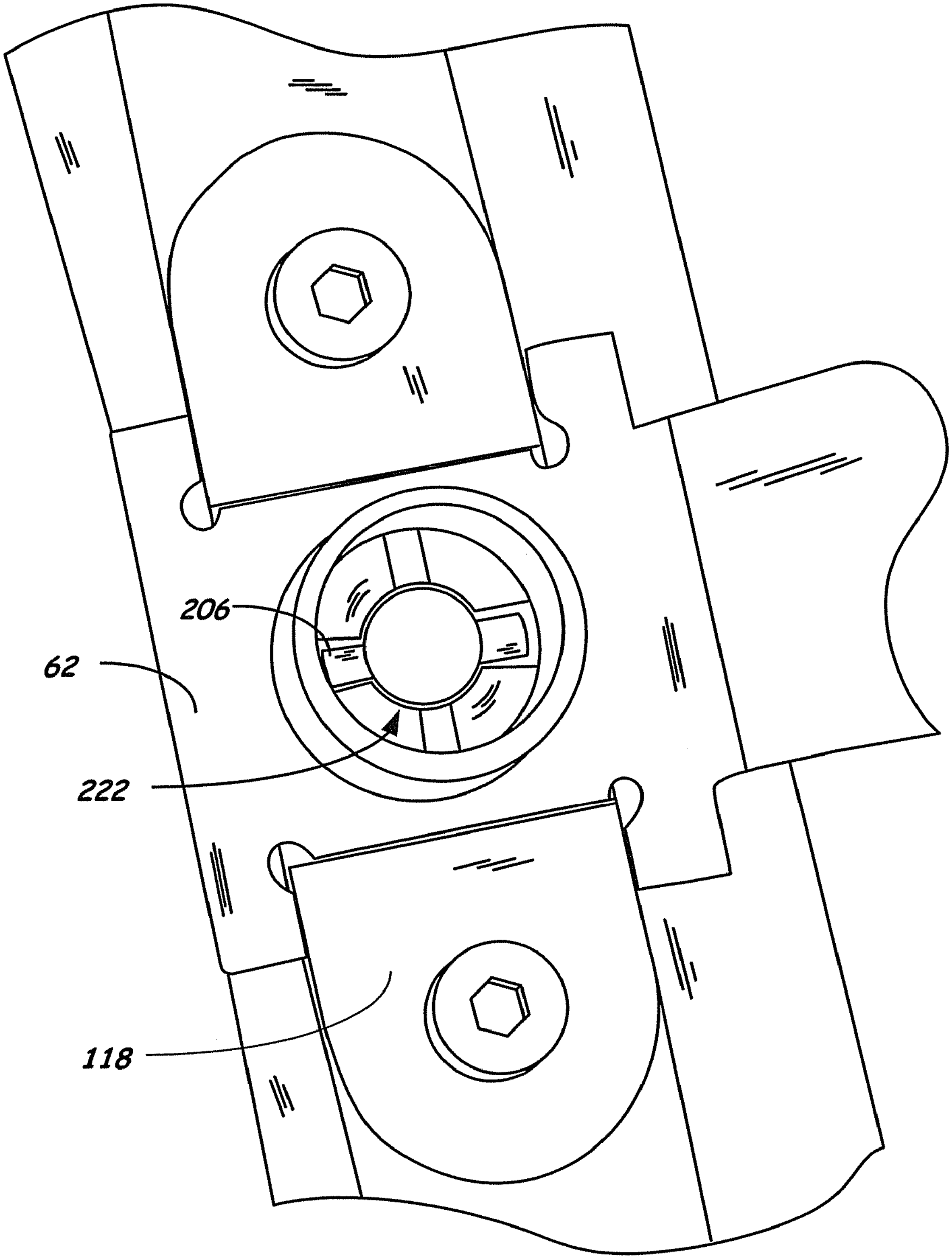
FIG. 11 is a perspective view illustrating a relationship between the hinge securing mechanism and the bushing when a hinge is being secured to the door.
Figure 12:
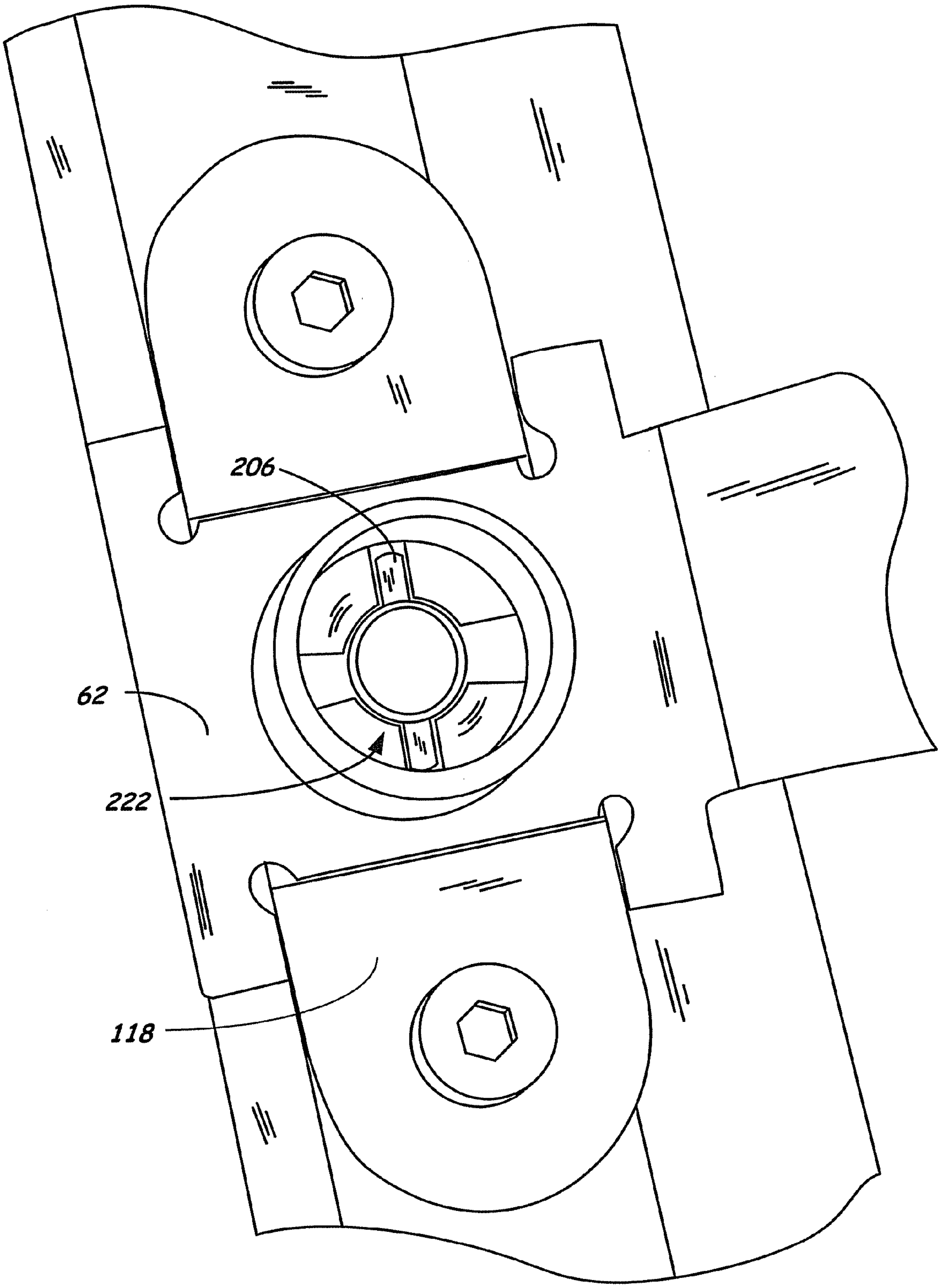
FIG. 12 is a perspective view illustrating a relationship between the hinge securing mechanism and the bushing when the hinge is not secured to the door.
Figure 13:
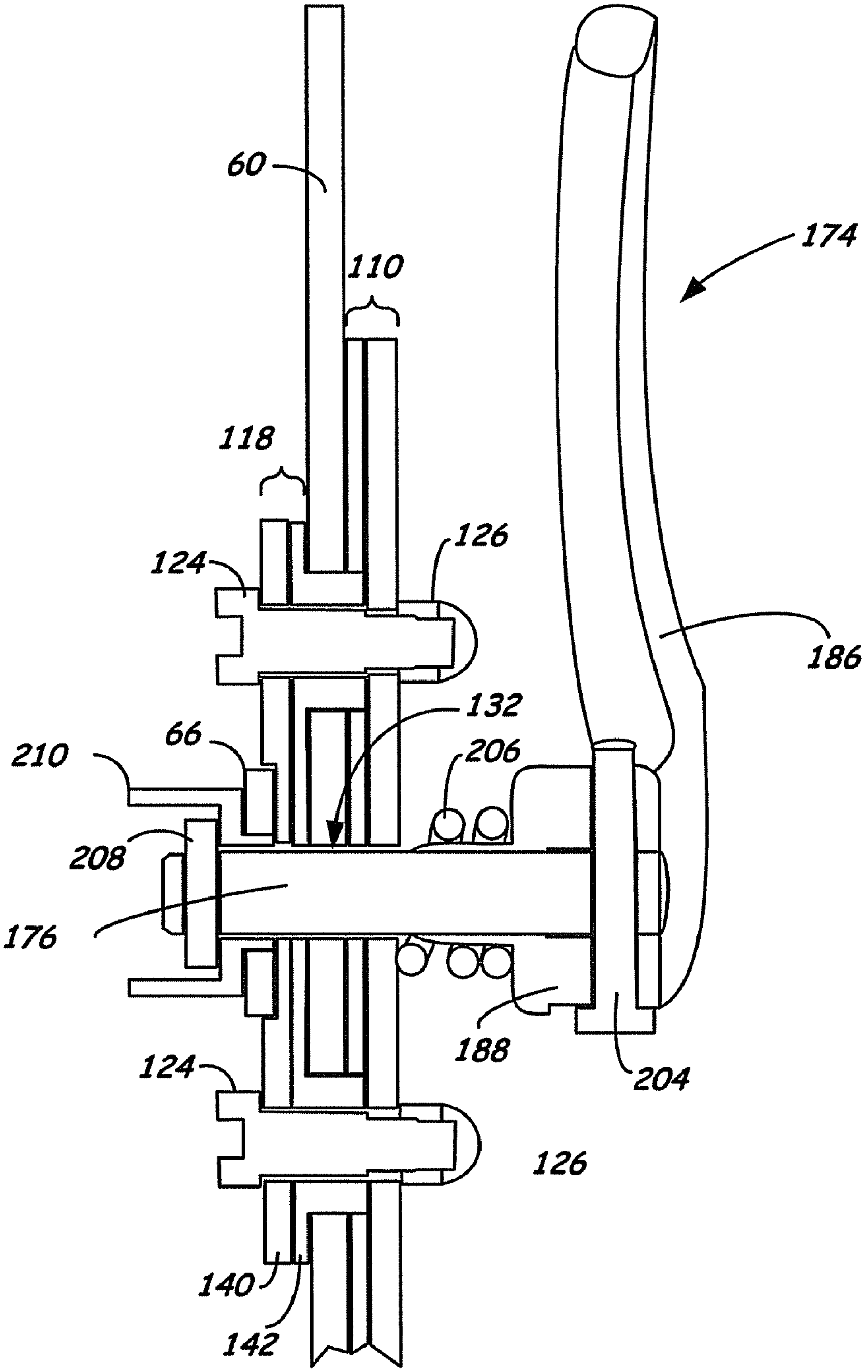
FIG. 13 is a cross-sectional view of a hinge secured to the hinge securing mechanism taken at a hinge mounting location with the hinge portion of FIG. 5 secured to the door.

Once the hinge component is positioned on the hinge securing mechanism, a stop is placed on the hinge securing mechanism to hold the hinge wing on the hinge securing mechanism. This is illustrated in block 306. In the embodiments discussed above, the stop is illustratively bushing 210 into which the second end 184 of the shaft 176 is inserted. The bushing 210 is then oriented so that the neck 214 of the bushing 210 is aligned with the aperture 168 of the second hinge wing 66. To achieve this alignment, the lever 190 is rotated so that it is not in a vertical position as is shown in the FIGs. The lever 190 is then rotated to cause the pin 208 to travel up the ramps 228 and 236 until the pin is seated in channels 232 and 238 and the lever 190 is in a vertical position. FIGS. 11 and 12 illustrate the pin 208 as it first enters the bore 222 and the pin 208 seated in the channels 232 and 238, respectively. FIG. 13 illustrates a cross sectional view of the hinge securing mechanism 174 secured to the door 60, similar to the view illustrated in FIG. 8. In this illustration, however, the second hinge wing 66 and the bushing 210 are also shown attached to the hinge securing mechanism. Spring 206 is compressed to hold the pin 208 in the channels 232 and 238 and to cause the second hinge wing 66 to engage the first member 140 of the third portion 118 of the support structure 108. The arrangement of the features 224 and 226 as well as the interface between the neck 214 and the aperture 168 ensures that when the pin 208 is properly seated in the channels 232 and 238, the lever 190 is positioned as illustrated in FIG. 13, that is it is rotated so that it is the vertical position, which causes the lever 190 to be in general alignment with the first portion 110 of the support structure 108.

Figure 14:
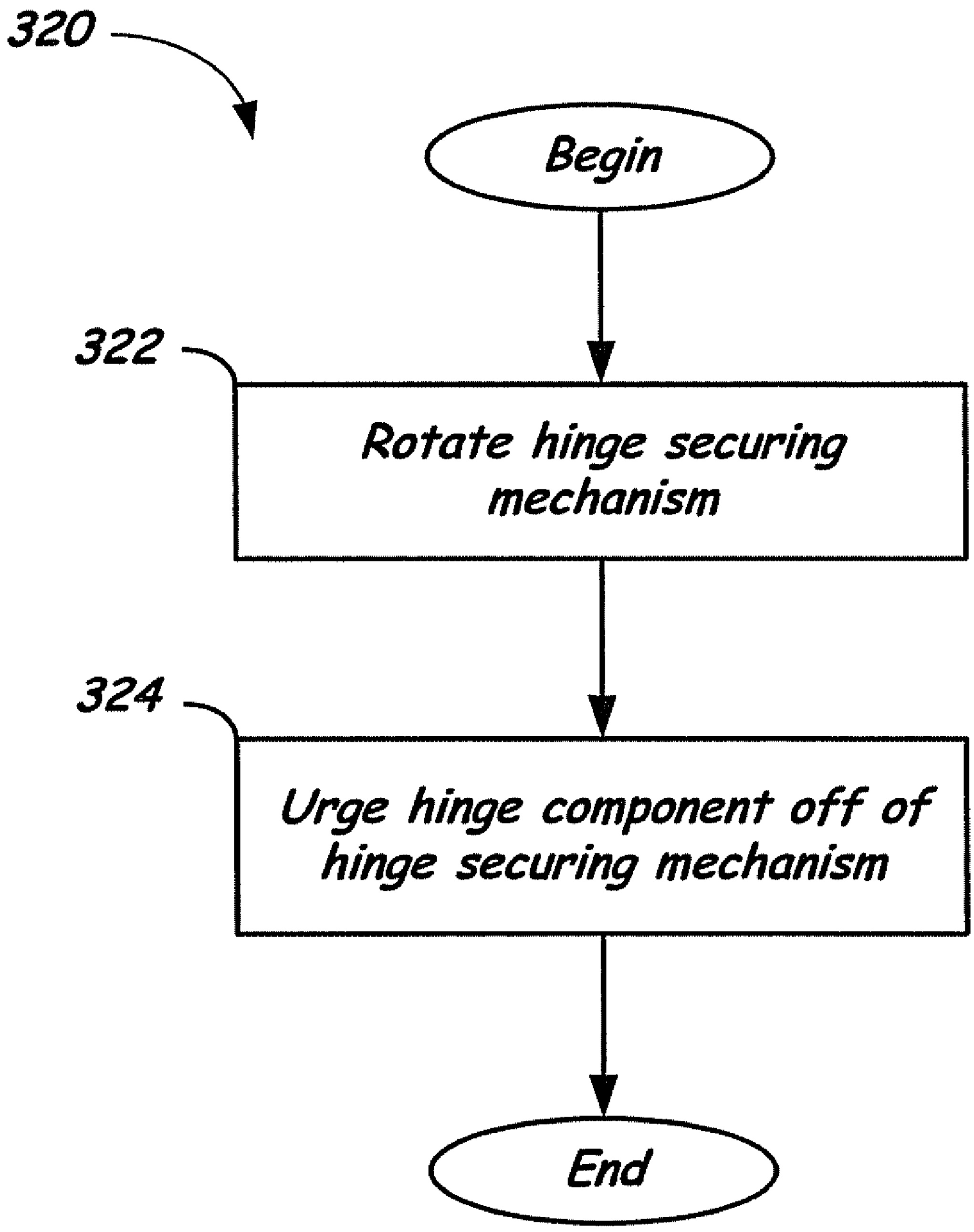
FIG. 14 is a flowchart illustrating a method of releasing a door from a cab according to one illustrative embodiment.

FIG. 14 illustrates a method 320 for removing a door from a hinge according to one illustrative embodiment. In block 322, an operator rotates a lever attached to a hinge securing mechanism to cause a stop to be released from the hinge securing mechanism. In one illustrative embodiment, lever 190 is rotated cause the pin 208 to be released from channels 232 and 238 to cause the pin 208 to travel down the ramps 228 and 234 until the pin 208 exits the bore 222. Once the pin 208 exits the bore 222, the force of the spring 206 generally urges the shaft 176 out of the bushing 210 and the bushing 210 is thus released from the hinge securing mechanism 174. In one embodiment, the lever 190 is rotated about 90 degrees or less to cause the bushing 210 to be released from the hinge securing mechanism 174. Because the spring 206 acts to hold the pin 208 in the channels 232 and 238 when they are thus seated, in some embodiments, it is necessary to apply a force to the handle 186 that opposes the force provided spring 206 prior to rotating the lever 190 to dislodge to pin 208 from the channels 232 and 238. In some embodiments, a plurality of hinges are secured to the door. In such embodiments, a lever is rotated to release a stop from each hinge securing mechanism and free each of the hinges from the door.

Once the stops have been released, the hinge component is urged off of the hinge securing mechanism to release the door from the hinge. This is illustrated in block 324. In one embodiment, this is accomplished by grabbing the levers 190 and pulling the door 60 away from the second hinge wings 66 to cause the second hinge wings to be disengaged from the door. At this point, the door 60 is removed from the hinges and can be taken off of the cab 16. Even though the door 60 is now free from the hinges, the hinge securing mechanism 174 remains attached to the door. The hinges can then be reattached to the door 60 by employing the method 300 described above.

The embodiments above provide several advantages. By releasably securing hinges to a door, an operator can easily remove a door from an operator compartment when necessary even when an obstruction is placed in front of the door and even if the door is latched. This allows an operator to exit the operator compartment without requiring the door to be swung open on the hinges. In addition, because the hinge securing mechanism is attached to the door, releasing the hinges from the door does not also result in having the entire mechanism release from the door. Furthermore, because the hinge pivot includes a pin coupled to the second hinge wing that is capable of being fitted into a socket in the first hinge wing, the door can be removed from the cab simply by lifting the door so that the pins on the second hinge wings are removed from the sockets of the first hinge wings, thereby allowing the door to be removed without releasing the second hinge wing from the door.

Although the discussion has been focused upon illustrative embodiments, workers skilled in the art will recognize that changes may be made in form and detail without departing from the spirit and the scope of the discussion.

What is claimed:

1. A power machine having a frame, an engine, a cab that defines an operator compartment having an opening for allowing access thereto, and a door with opposing interior and exterior surfaces capable of being attached to the cab to substantially cover the opening, comprising:

a hinge for attaching the door to the cab including a first hinge component attached to the cab and a second hinge component configured to be attached to the door at a hinge mounting location and having a face with an aperture formed through it, wherein one of the first hinge component and the second hinge component includes a pin and the other of the first hinge component and the second hinge component includes a socket configured to accept the pin to rotatably couple the first hinge component to the second hinge component;

a hinge securing mechanism rotatably coupled to the door configured to fixedly secure the second hinge component to the door, including a shaft with a handle coupled to a first end of the shaft and a protrusion fixed to and extending radially from the shaft proximal to a second end of the shaft, wherein the hinge securing mechanism is configured to be coupled to the door prior to the securing to the door of the second hinge component;

a bushing configured to be engaged with the hinge securing mechanism when the second hinge component is mounted to the door, wherein the bushing has a cavity that is defined at least in part by an internal feature and is configured to accept and engage the radially extending protrusion of the hinge securing mechanism when the bushing is attached to the hinge securing mechanism;

wherein the door has a bore formed through it at the hinge mounting location, the shaft extends through the bore so that the handle is positioned proximal to the interior surface and the protrusion proximal to the exterior surface and wherein the protrusion extends radially from the shaft, and the handle is moveable between a first position and a second position;

wherein the second hinge component is positioned so that the shaft extends through the aperture formed in the second hinge component when the second hinge component is mounted to the door; and wherein the bushing is configured so that movement of the handle from the second position to the first position when the radially extending protrusion has been accepted into the cavity causes the protrusion to be engaged by the bushing.

2. The power machine of claim 1, wherein the bushing has a main portion and a neck that extends from the main portion and has a smaller cross sectional area than the main portion.

3. The power machine of claim 2, wherein the neck is capable of being accepted into the aperture formed in the second hinge component and engaging the second hinge component.

4. The power machine of claim 1, wherein the hinge securing mechanism is configured so that movement of the handle from the first position to the second position causes the bushing to be released from the hinge securing mechanism.

5. The power machine of claim 1 and further comprising:

a bracket attached to the door and configured to engage the second hinge component when the second hinge component is mounted to the door.

6. The power machine of claim 5, wherein the bracket has an aperture formed through it that is aligned with the bore in the door when the bracket is attached to the door and wherein the shaft of the hinge securing mechanism extends through the aperture in the bracket.

7. The power machine of claim 1 and further comprising:

a spring positioned between the door and the handle so that it applies a force to the door and the handle.

8. A method of attaching a door to a frame, comprising:

securing a first hinge wing to the cab;

securing a second hinge wing to the door, including:

attaching a hinge securing mechanism having a shaft with handle on a first end and protrusion that extends radially from the shaft proximal to a second end of the shaft to the door;

placing the second hinge wing over the second end of the shaft;

fitting a bushing with an internal cavity over the second end of the shaft; and rotating the handle from a first position to a second position to cause the protrusion proximal to the second end of the shaft to engage an internal feature of the bushing that defines the cavity and secure the second hinge wing to the hinge securing mechanism; and coupling the first hinge wing and the second hinge wing.

9. The method of claim 8 and further comprising:

rotating the handle from the second position to the first position to release the second hinge wing from the door.

10. The method of claim 9, wherein rotating the handle from the second position to the first position causes the hinge securing mechanism to become disengaged from a stop previously engaged with the hinge securing mechanism.

11. The method of claim 8 and wherein attaching the hinge securing mechanism to the door includes capturing a spring between the handle and the door so that the spring applies a first force against the handle and the door and wherein rotating the handle from the first position to the second position includes applying a second force to at least partially overcome the first force.

12. The method of claim 8 and further comprising:

attaching a bracket having an anti-rotation feature to the door and wherein placing the second hinge wing over the second end of the shaft includes positioning the second hinge wing to engage the anti-rotation feature.

13. A system for attaching a door to a frame, comprising:

a first hinge component attached to the frame;

a hinge securing mechanism operably coupled to the door, including a shaft with a lever coupled to a first end and a second end that extends through an aperture in the door, wherein the lever is moveable between a first position and a second position;

a second hinge component having a face with an aperture formed through it capable of receiving the second end of the shaft through the aperture when the lever is in a first position;

a stop positioned on the shaft, wherein the stop engages the second hinge component when the second hinge component is secured to the door; and wherein the shaft has a protrusion extending transversely proximal to the second end thereof and wherein the stop has a cavity defined at least in part by an internal feature configured to accept a portion of the second end of the shaft therein and wherein moving the lever from the first position to the second position causes the protrusion to be engaged by the stop and causes the second hinge component to be secured to the door when the second end of the shaft extends through the aperture in the second hinge component.

14. The system of claim 13 and further comprising:

a spring positioned on the shaft between the handle and the door.

15. The system of claim 13 and further comprising:

a structure fixedly attached to the door having an anti-rotation feature capable of engaging the second hinge component when the second hinge component is secured to the door.

* * * * *